United States Patent
Moore (10) Patent No.: US 7,531,914 B1
(45) Date of Patent: May 12, 2009

(54) DUAL PATH OUTPUT CURRENT LEVEL CONTROL

(75) Inventor: Daniel D Moore, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 45 days.

(21) Appl. No.: 11/610,112

(22) Filed: Dec. 13, 2006

(51) Int. Cl.
*H02H 9/00* (2006.01)

(52) U.S. Cl. ............................ 307/35; 307/9.1; 307/11; 307/31; 307/42

(58) Field of Classification Search ............. 307/11–12, 307/30–32, 35, 38–39, 42
See application file for complete search history.

(56) References Cited

U.S. PATENT DOCUMENTS

| | | | | |
|---|---|---|---|---|
| 3,671,853 A | * | 6/1972 | Weischedel et al. | ......... 323/267 |
| 3,790,878 A | * | 2/1974 | Brokaw | ...................... 323/267 |
| 4,669,036 A | * | 5/1987 | Cowett, Jr. | ................ 363/21.09 |
| 4,673,826 A | * | 6/1987 | Masson | ........................ 307/66 |
| 5,119,013 A | * | 6/1992 | Sabroff | ........................ 323/267 |
| 5,126,652 A | * | 6/1992 | Carlin | ........................ 323/267 |
| 5,739,592 A | | 4/1998 | Rigsby et al. | |
| 5,835,360 A | * | 11/1998 | Jansen | ..................... 363/21.04 |
| 2003/0020331 A1 | | 1/2003 | Burdick et al. | |
| 2006/0085099 A1 | | 4/2006 | Burlak et al. | |

* cited by examiner

*Primary Examiner*—Fritz M. Fleming
*Assistant Examiner*—Adi Amrany
(74) *Attorney, Agent, or Firm*—Harness, Dickey & Pierce P.L.C.

(57) ABSTRACT

A current control system for an electrical connection device generally includes a first output having a first current rating and a second output having a second current rating. A transistor provides current to the first output and the second output. A sensor is electrically disposed between the transistor and the second output and generates a sensor signal based on a flow of current to the second output. A current control module receives the sensor signal and controls the transistor to provide current based on one of the first and the second current rating.

23 Claims, 6 Drawing Sheets

Figure 5

DUAL PATH OUTPUT CURRENT LEVEL CONTROL

FIELD

The present teachings relate to methods and systems for controlling current to varying loads using a single output connector.

BACKGROUND

It is common for an owner of a vehicle, such as an automobile, truck or the like, to tow or trail various trailers, such as a camper trailer, a boat trailer, a storage trailer, or the like. Electrical power is made available to the trailer by means of an electrical wire connector electrically connected to the towing vehicle's electrical supply system. Vehicle electrical connectors can be made to accommodate connection between the various trailers and the vehicle. For example, the Society of Automotive Engineers (SAE) has promulgated a standardized connection scheme that allows for intermixed connection between various types of vehicles and trailers.

In some vehicles, a standardized connection scheme includes two vehicle electrical connectors to allow for intermixed connection between the vehicle and two mutually exclusive trailer connectors. For example, a four pin vehicle electrical connector is provided for lighter duty trailers and a seven pin vehicle electrical connector is provided for heavier duty trailers. Three common circuits between the four and seven pin connectors are Right Turn Stop, Left Turn Stop and Running Lights. The three common circuits are hardwired on the vehicle with a current rating set to heavy duty, seven pin connector drive needs. This leaves the four pin electrical connector and light duty trailer system prone to overload conditions that can damage the connector terminals and the trailer wiring.

Figure 1A:
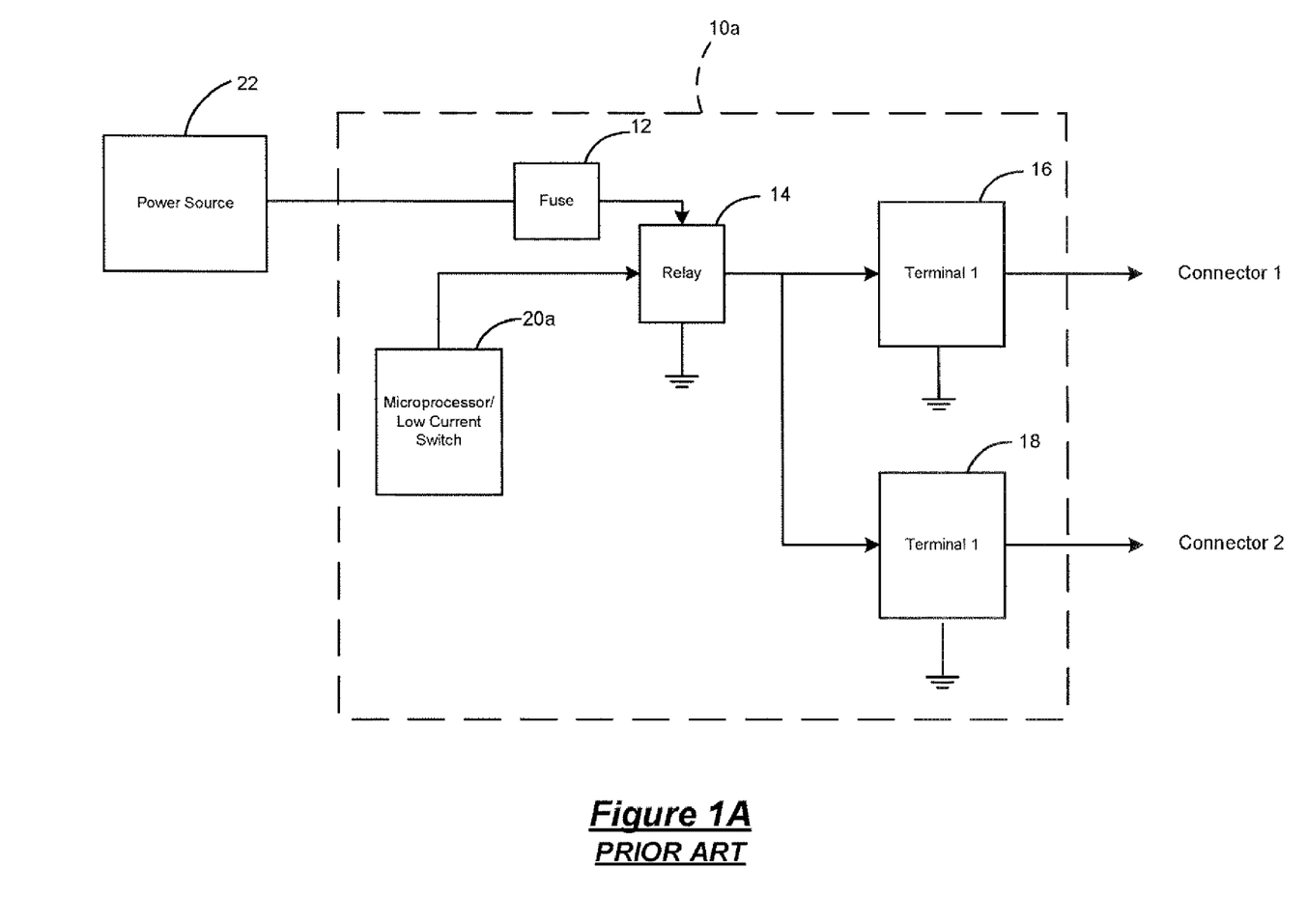
FIG. 1A is a block diagram illustrating a current control system that includes a relay and a fuse in accordance with the prior art.
Figure 1B:
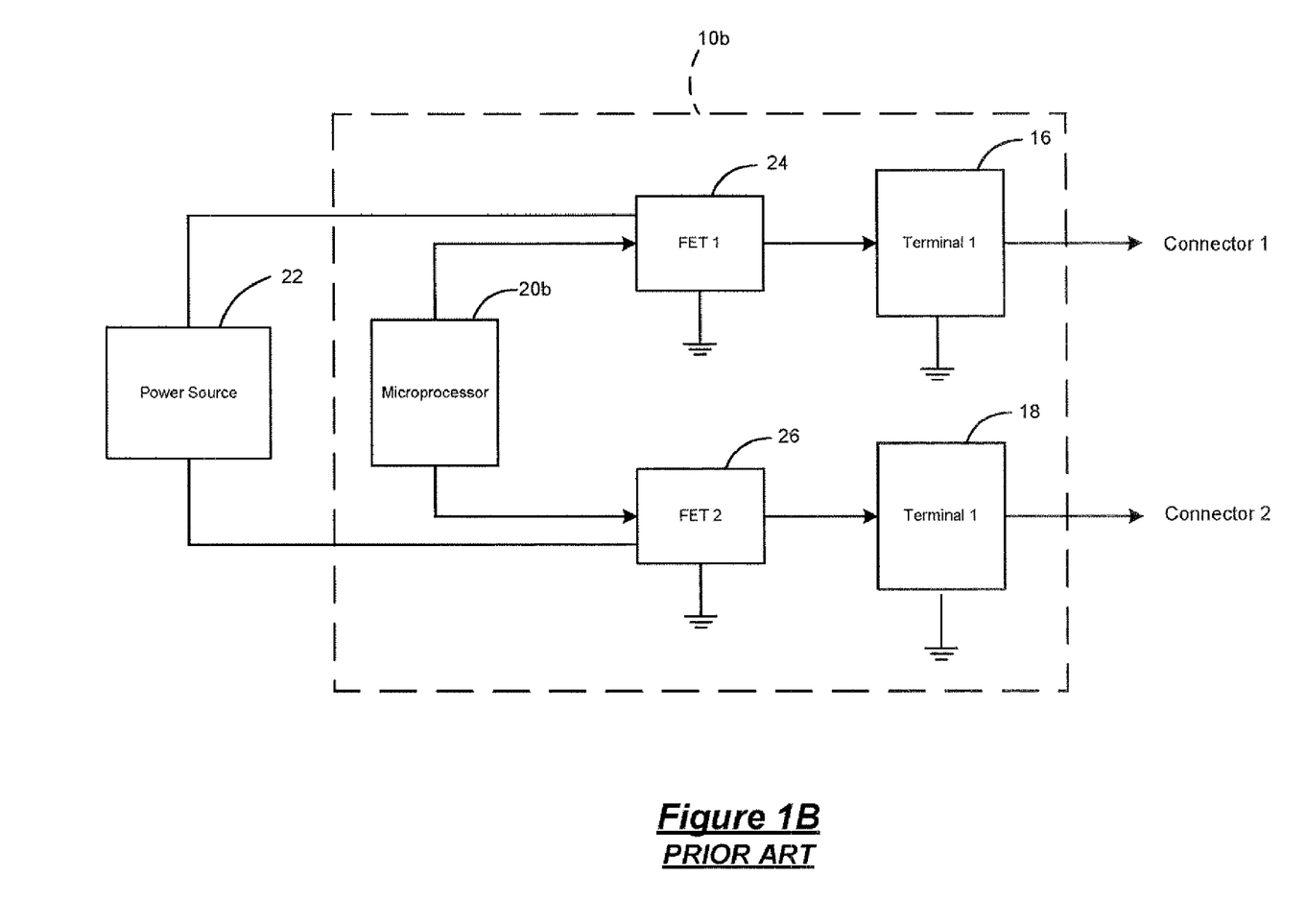
FIG. 1B is a block diagram illustrating a current control system that includes at least two transistors in accordance with the prior art

To ensure that the proper levels of current are supplied to each of the various trailers, a vehicle electrical connector circuit is provided that regulates current to each output of the two vehicle electrical connectors. As shown in FIG. 1A and according to various aspects of the prior art, a connector circuit 10a provides a fuse 12 and a relay 14 that is controlled by a microprocessor or low current switch 20a to ensure that the current level provided to outputs 16 and 18 from a power source 22 does not exceed a predetermined current level. As shown in FIG. 1B and according to various aspects of the prior art, a connector circuit 10b provides a transistor 24 and 26 for each output 16 and 18 respectively. The transistors 24 and 26 are individually controlled by a microprocessor 20b to ensure that the current level provided to the outputs 16 and 18 from the power source 22 does not exceed a predetermined current level. Implementing separate transistors 24 and 26 or a fuse 12 and a relay 14 for outputs 16 and 18 can be costly.

SUMMARY

The present teachings generally include a current control system for an electrical connection device. The current control system includes a first output having a first current rating and a second output having a second current rating. A transistor provides current to the first output and the second output. A sensor is electrically disposed between the transistor and the second output and generates a sensor signal based on a flow of current to the second output. A current control module receives the sensor signal and controls the transistor to provide current based on one of the first and the second current rating.

Further areas of applicability will become apparent from the description provided herein. It should be understood that the description and specific examples are intended for purposes of illustration only and are not intended to limit the scope of the present teachings.

BRIEF DESCRIPTION OF THE DRAWINGS

The drawings described herein are for illustration purposes only and are not intended to limit the scope of the present teachings in any way.

DETAILED DESCRIPTION

The following description is merely exemplary in nature and is not intended to limit the present teachings, their application, or uses. It should be understood that throughout the drawings, corresponding reference numerals indicate like or corresponding parts and features. As used herein, the term module, control module, component and/or device can refer to one or more of the following: an application specific integrated circuit (ASIC), an electronic circuit, a processor (shared, dedicated or group) and memory that executes one or more software or firmware programs, a combinational logic circuit and/or other suitable mechanical, electrical or electromechanical components that can provide the described functionality and/or combinations thereof.

Figures 2A, 2B:
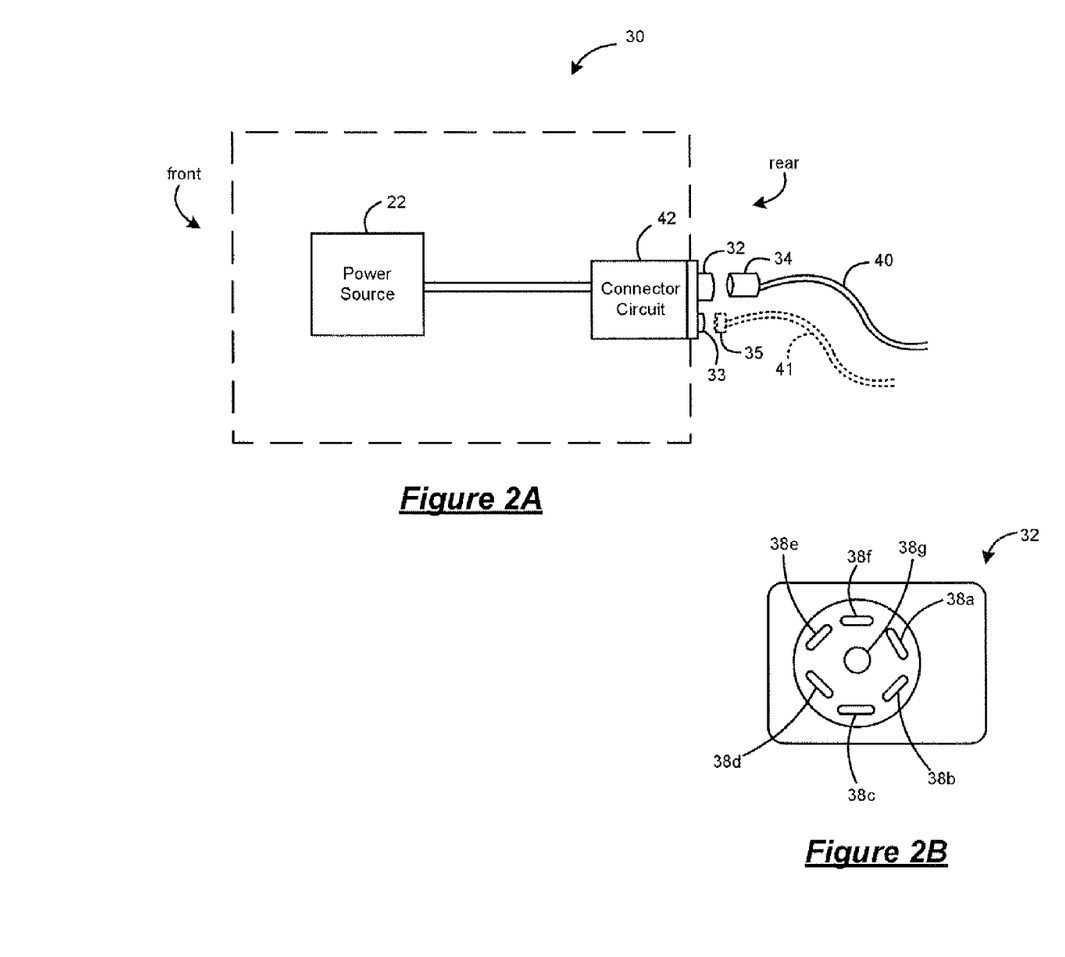
FIG. 2A is a block diagram illustrating a vehicle including a current control system used for a trailer connector in accordance with various aspects of the present teachings.
FIG. 2B is diagram of an exploded front view of a vehicle electrical connector of FIG. 2A in accordance with various aspects of the present teachings.

With reference to FIG. 2A and in one aspect of the present teachings, a vehicle 30 that can include a current control system for a vehicle electrical connector system is shown. It can be appreciated in light of the disclosure that the current control system may be applicable to various electrical connection devices. For example, a similar electrical connection device may be used for tractors and trailers and between multiple trailers. For exemplary purposes, various aspects of the current control system will be discussed in the context of vehicle electrical connectors 32 and 33 and at least one trailer electrical connector 34 or 35.

Figure 2C:
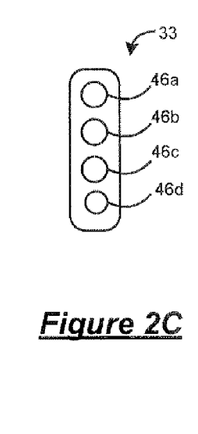
FIG. 2C is a diagram of an exploded front view of another vehicle electrical connector of FIG. 2A in accordance with various aspects of the present teachings.

As shown in FIG. 2A, the vehicle 30 can include at least two vehicle electrical connectors 32 and 33 that can couple to or near a rear end of the vehicle 30. An exemplary exploded front view of a first vehicle electrical connector 32 is shown in FIG. 2B. An exemplary exploded front view of a second vehicle electrical connector 33 is shown in FIG. 2C. The vehicle electrical connectors 32 and 33 can each include a plurality of output pins 38a-38g and 46a-46d respectively. The plurality of output pins 38a-38g and 46a-46d can mate with a plurality of receptacles, or electrical terminals of a trailer electrical connector 34 or 35, respectively.

In various embodiments, the trailer electrical connectors 34 and 35 can be connected and disconnected to the vehicle electrical connectors 32 and 33, respectively. One trailer electrical connector 34 or 35 can be connected to the corresponding vehicle electrical connector 32 or 33 at a time. When connected to the vehicle electrical connector 32 or 33, the trailer electrical connector 34 or 35 can provide current to various electrical systems of the trailer via a wiring harness 40 or 41. Such systems may include, but are not limited to, tail light systems, turn signal systems, and braking systems.

As will be discussed further below, the current control system of the present teachings can include a connector circuit 42 that can detect which trailer electrical connection 34 or 35 is connected to the corresponding vehicle electrical connector 32 or 33 and can provide current at a sufficient rate to control the varying electrical loads of each trailer. Generally speaking, the connector circuit 42 can include one or more devices that can control current to each output pin 38a-38g and 46a-46d based on predetermined protection levels that can each indicate a current rating.

Figure 3:
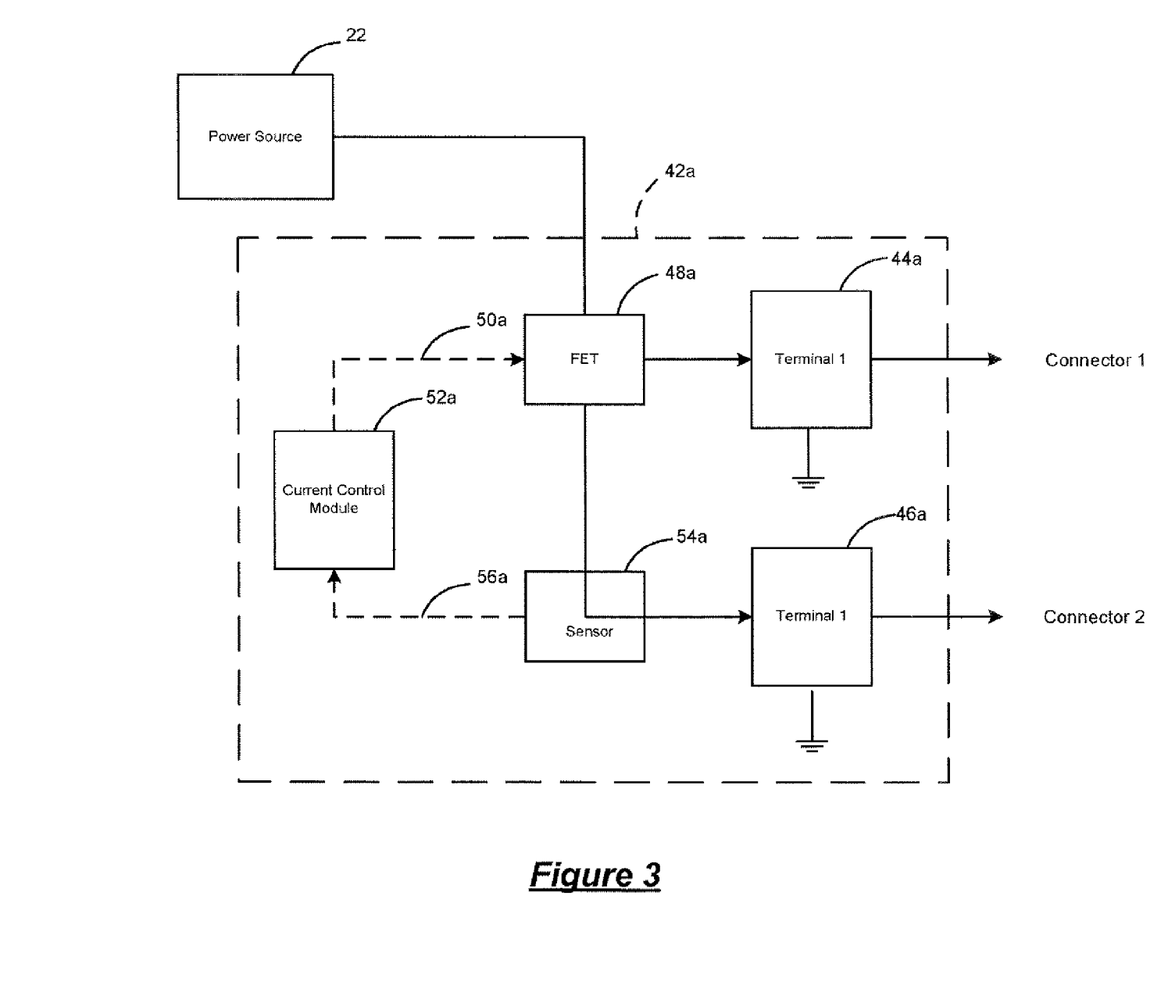
FIG. 3 is a block diagram illustrating a current control system in accordance with various aspects of the present teachings.

More specifically, with reference to FIG. 3, a block diagram illustrating a connector circuit 42a of the current control system in accordance with various aspects of the present teachings is shown. The connector circuit 42a can provide current to output pins that can be associated with either the first vehicle electrical connector 32 (connector 1) or the second vehicle electrical connector 33 (connector 2). A single transistor 48a can regulate current from the power source 22 to both output terminals 44a and 46a based on a control signal 50a received from a current control module 52a. In various aspects, the transistor 48a can be a field effect transistor.

A sensor 54a can be electrically disposed between the transistor 48a and the second output terminal 46a. The sensor 54a can sense the presence or absence of current flow to the second output terminal 46a once the trailer electrical connector 35 (FIG. 2A) is connected to the vehicle electrical connector 33 (FIG. 2A). The sensor 54a can be, but is not limited to, a thermistor that detects a rise in temperature, a shunt, a Hall Effect sensor, other similar devices and/or one or more combinations thereof. The sensor 54a can generate a sensor signal 56a to the current control module 52a. Based on the sensor signal 56a, the current control module 52a can determine which trailer electrical connector 34 or 35 is connected and can regulate the transistor 48a based on the predetermined protection levels. In various aspects of the present teachings, the current control module 52a can include software for performing a current control method as will be discussed further below.

It can be appreciated in light of the disclosure that, for electrical connection devices with multiple output terminals, the transistor and sensor circuitry discussed above can be implemented for each common pair of output terminals between the two trailer electrical connection configurations as discussed above. It can be appreciated in light of the disclosure that multiple sensors can be similarly used for multiple connectors.

Figure 4:
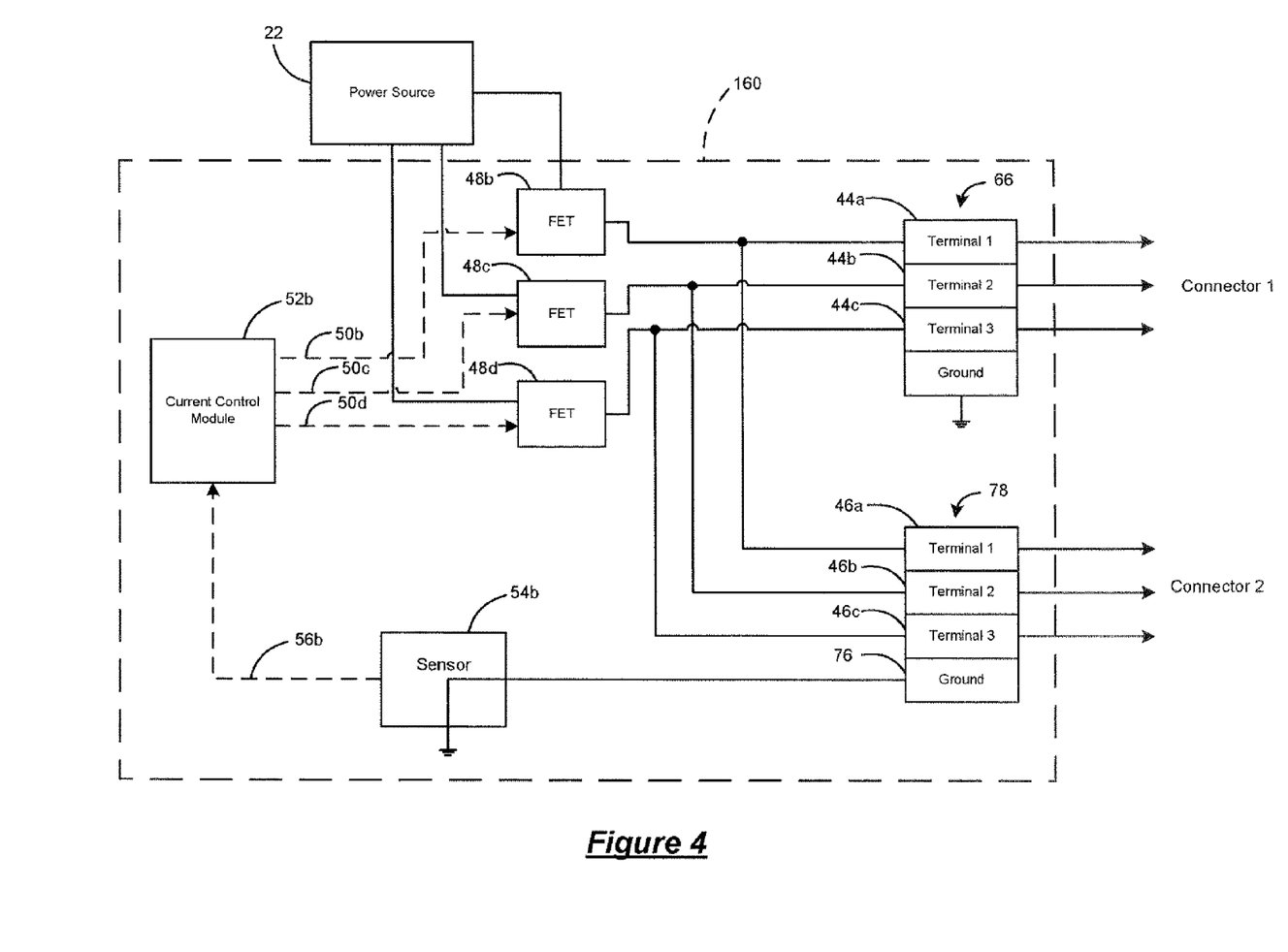
FIG. 4 is a block diagram illustrating a current control system in accordance with various other aspects of the present teachings.

With reference to FIG. 4, a block diagram illustrating a connector circuit 160 of the current control system in accordance with other various aspects of the present teachings is shown. Multiple output terminals 44a, 44b, and 44c shown generally at 66 can be used to provide current to the first vehicle electrical connector 32 (FIG. 2A) (connector 1). Provided the seven output pin example shown in FIG. 2B, not all output terminals are shown. Multiple outputs terminals 46a, 46b and 46c shown generally at 78 can be used to provide current to the second vehicle electrical connector 33 (FIG. 2A) (connector 2). Transistors 48b, 48c, and 48d can regulate current from the power source 22 to common output terminals of each connector. The transistors 48b, 48c, and 48d can operate based on control signals 50b, 50c, and 50d, respectively, received from the current control module 52b. In various aspects, the transistors 48b, 48c, and 48d can be field effect transistors.

A sensor 54b can electrically connect to a ground 76 associated with the second vehicle electrical connector 33 (FIG. 2A). The sensor 54b can sense the presence or absence of current flow to the output terminals 46a, 46b, and 46c once the trailer electrical connector 35 (FIG. 2A) is connected to the vehicle electrical connector 33 (FIG. 2A). The sensor 54b can be, but is not limited to a thermistor that detects a rise in temperature, a shunt, a Hall Effect sensor, other suitable devices, and/or one or more combinations thereof. The sensor 54b can generate a sensor signal 56b to the current control module 52b. Based on the sensor signal 56b, the current control module 52b can determine which trailer electrical connector 34 or 35 (FIG. 2A) is connected and can regulate the transistors 48b, 48c, and 48d based on one or more predetermined current levels. In various aspects of the present teachings, the current control module 52b can include software for performing a current control method as will be discussed further below.

Figure 5:
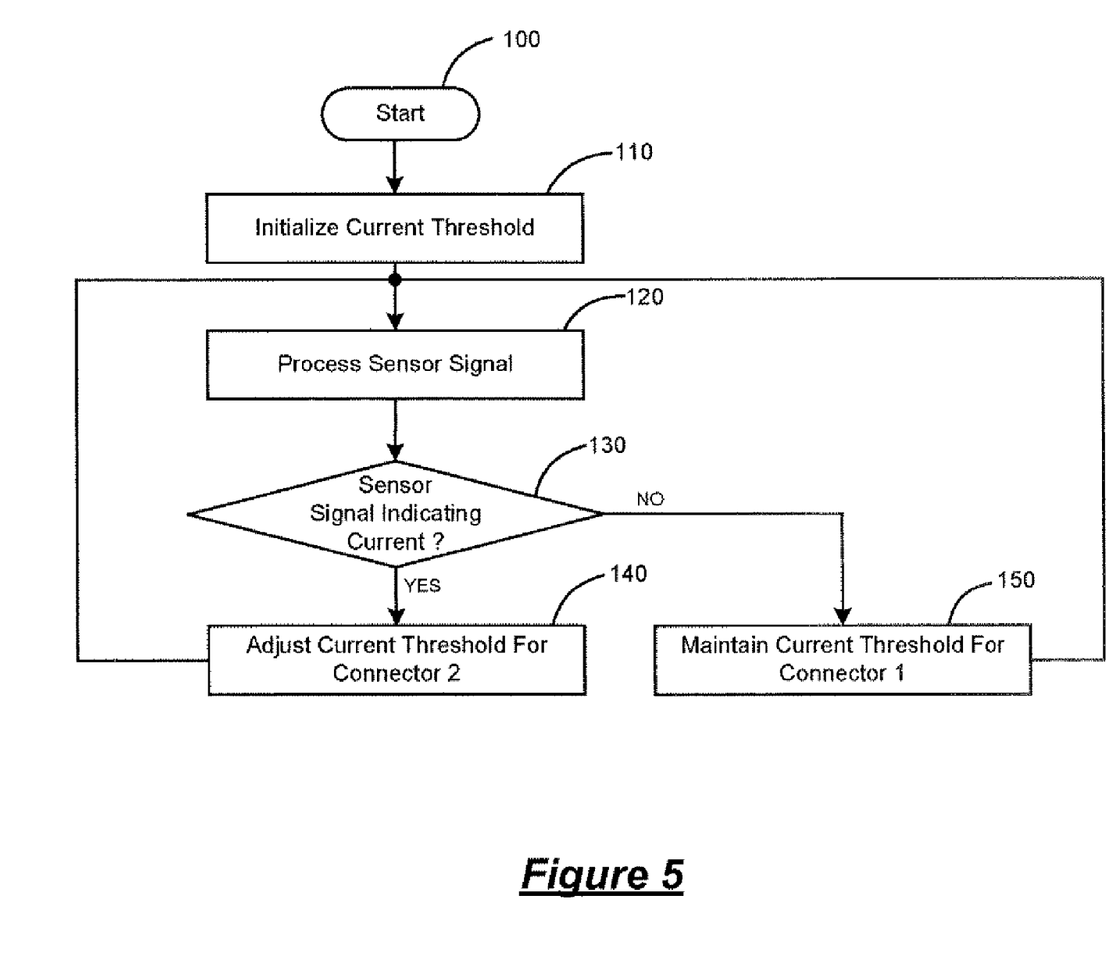
FIG. 5 is a process flow diagram illustrating a current control method as performed by the current control system in accordance with various aspects of the present teachings.

With reference to FIG. 5, a process flow diagram illustrating a current control method as performed by the current control system in accordance with various aspects of the present teachings is shown. The method may be run by the current control modules 52a or 52b of the connector circuits 42a and 160 continually during vehicle operation. As can be appreciated, the order of operation of the steps within the method is not limited to the sequential execution as illustrated in FIG. 5, but may be performed in one or more varying orders as applicable, in accordance with the present teachings.

In one example, the method begins at 100. A current threshold is initialized to a first predetermined protection level at 110. In various aspects of the present teachings, the first predetermined protection level can be the higher of the two predetermined levels so as to not deprive a higher electrical load from initially receiving the appropriate current. In various other aspects of the present teachings, the first predetermined protection level can be a lower of the two predetermined levels so as to prevent the possibility of over-powering the lower electrical load.

At 120, the sensor signal 56a or 56b can be processed. The sensor signal 56a or 56b can be evaluated at 130 according to the type of sensor implemented in the connector circuit 42a or 42b. For example, if a thermistor were implemented, the sensor signal 56a or 56b would be evaluated based on a predetermined temperature that would indicate current flow to that output terminal. If the sensor signal 56a or 56b indicates that current is flowing, the current threshold can be adjusted to the second predetermined protection level at 140. Otherwise, if the sensor signal 56a or 56b indicates that current is not flowing at 130, the current threshold can be maintained at the first predetermined protection level at 150. Thereafter, the sensor signal 56a or 56b can be continually processed and evaluated at 120 and 130 while the vehicle 30 is operating.

While specific aspects have been described in this specification and illustrated in the drawings, it will be understood by those skilled in the art that various changes can be made and equivalents can be substituted for elements thereof without departing from the scope of the present teachings, as defined in the claims. Furthermore, the mixing and matching of features, elements and/or functions between various aspects of the present teachings may be expressly contemplated herein so that one skilled in the art will appreciate from the present teachings that features, elements and/or functions of one aspect of the present teachings may be incorporated into another aspect, as appropriate, unless described otherwise above. Moreover, many modifications may be made to adapt a particular situation, configuration or material to the present teachings without departing from the essential scope thereof. Therefore, it may be intended that the present teachings not be limited to the particular aspects illustrated by the drawings and described in the specification as the best mode presently contemplated for carrying out the present teachings but that the scope of the present teachings will include many aspects and examples following within the foregoing description and the appended claims.

What is claimed is:

1. A current control system for an electrical connection device, the current control system comprising:
    a first output having a first predetermined protection level related to a first load that may be connected to the first output;
    a second output having a second predetermined protection level related to a second load that may be connected to the second output;
    a transistor that provides current to the first output and the second output;
    a sensor electrically disposed between the transistor and the second output and that generates a sensor signal based on detecting a flow of current to the second output; and
    a current control module that receives the sensor signal and that controls the transistor to provide current based on the sensor signal to either the first output at or below the first predetermined protection level or to the second output at or below the second predetermined protection level.

2. The current control system of claim 1 wherein the sensor is one of a thermistor, a shunt, and a Hall-effect sensor.

3. The current control system of claim 1 wherein the transistor is a field-effect transistor.

4. The current control system of claim 1 wherein the control module initially controls the transistor to provide current at or below the first predetermined protection level.

5. The current control system of claim 4 wherein the control module controls the transistor to provide current at or below the second predetermined protection level once the sensor signal indicates that current is flowing to the second output.

6. The current control system of claim 1 wherein the control module initially controls the transistor to provide current at or below the second predetermined protection level.

7. The current control system of claim 6 wherein the control module controls the transistor to provide current at or below the first predetermined protection level once the sensor signal indicates that current is not flowing to the second output.

8. A current control system for an electrical connection device, the current control system comprising:
    a first output that is associated with a first connector having a first predetermined protection level related to a first load that may be connected to the first connector;
    a second output that is associated with a second connector having a second predetermined protection level related to a second load that may be connected to the second connector;
    a transistor that provides current to the first output and the second output;
    a sensor electrically connected to a ground associated with the second connector and that generates a sensor signal based on the detection of at least one of a presence and an absence of current flow; and
    a current control module that receives the sensor signal and that controls the transistor to provide current based on the sensor signal to either the first output at or below the first predetermined protection level or to the second output at or below the second predetermined protection level.

9. The current control system of claim 8 wherein the sensor is one of a thermistor, a shunt, and a Hall-effect sensor.

10. The current control system of claim 8 wherein the transistor is a field-effect transistor.

11. The current control system of claim 8 wherein the control module initially controls the transistor to provide current at or below the first predetermined protection level.

12. The current control system of claim 11 wherein the control module controls the transistor to provide current at or below the second current threshold once the sensor signal indicates the presence of current flowing.

13. The current control system of claim 8 wherein the control module initially controls the transistor to provide current at or below the second current threshold.

14. The current control system of claim 13 wherein the control module controls the transistor to provide current at or below the first current threshold once the sensor signal indicates the absence of current flowing.

15. A method of controlling current to an electrical connection device, comprising:
    providing a single transistor that provides current to a first and a second output based on a current threshold;
    initializing the current threshold to a first predetermined protection level related to a first load that may be connected to the first output;
    processing a sensor signal that indicates at least one of a presence and an absence of current flow to the second output; and
    adjusting the current threshold to a second predetermined protection level related to a second load that may be connected to the second output when the sensor signal indicates the presence of current flowing to the second output.

16. The method of claim 15 further comprising maintaining the current threshold at the first predetermined protection level when the sensor signal indicates the absence of current flowing to the second output.

17. The method of claim 15 further comprising providing a sensor between the single transistor and the second output wherein the sensor generates the sensor signal.

18. The method of claim 15 further comprising providing a sensor electrically coupled to a ground associated with the second output wherein the sensor generates the sensor signal.

19. A current control system for an electrical connection device, the current control system comprising:
    a first output connector having a first predetermined protection level related to a first load that may be connected to the first output connector;
    a second output connector having a second predetermined protection level related to a second load that may be connected to the second output connector;

a transistor that provides current to the first output connector and the second output connector;

a sensor electrically disposed between the transistor and the second output connector and that generates a sensor signal by detecting a flow of current to the second output connector, the sensor signal being indicative of whether a load connector is connected to the second output connector; and a current control module that receives the sensor signal and that controls the transistor to limit current to either:

the first predetermined protection level, or the second predetermined protection level if the sensor signal indicates that the load connector is connected to the second output connector.

20. The current control system of claim 19 wherein the sensor is one of a thermistor, a shunt, and a Hall-effect sensor.

21. The current control system of claim 19 wherein the transistor is a field-effect transistor.

22. The current control system of claim 19 wherein the control module initially controls the transistor to provide current at or below the first predetermined protection level.

23. The current control system of claim 22 wherein the control module controls the transistor to provide current at or below the second current threshold once the sensor signal indicates that current is flowing to the second output.

\* \* \* \* \*